(12) United States Patent
Brazier

(10) Patent No.: US 8,245,615 B2
(45) Date of Patent: Aug. 21, 2012

(54) TIRE TREAD SKIVING MACHINE

(76) Inventor: Paul Brazier, Rockwood, MI (US)

( * ) Notice: Subject to any disclaimer, the term of this patent is extended or adjusted under 35 U.S.C. 154(b) by 898 days.

(21) Appl. No.: 12/255,702

(22) Filed: Oct. 22, 2008

(65) Prior Publication Data

US 2010/0095819 A1 Apr. 22, 2010

(51) Int. Cl.
*B26D 5/20* (2006.01)
(52) U.S. Cl. ............... 83/356; 83/171; 83/202; 83/401; 83/416; 83/424
(58) Field of Classification Search .............. 83/202, 83/356, 416, 424, 879, 240, 266, 422, 449, 83/171, 401, 48.8, 489, 614, 56, 42, 487, 83/488, 617
See application file for complete search history.

(56) References Cited

U.S. PATENT DOCUMENTS

| | | | | |
|---|---|---|---|---|
| 2,798,550 A * | 7/1957 | Kubodera | ........... | 83/356 |
| 3,161,098 A * | 12/1964 | Thumim | ........... | 83/90 |
| 6,732,620 B1 * | 5/2004 | Brodmann et al. | ........... | 83/488 |
| 2002/0178880 A1 * | 12/2002 | Downing | ........... | 83/13 |
| 2003/0150306 A1 * | 8/2003 | Sala et al. | ........... | 83/171 |

* cited by examiner

*Primary Examiner* — Ghassem Alie
(74) *Attorney, Agent, or Firm* — Gifford, Krass, Sprinkle, Anderson & Citkowski, P.C.

(57) ABSTRACT

A tire tread skiving machine having an elongated frame with two spaced ends. An elongated cutting platen extends transversely across the frame between the two ends. An infeed conveyor conveys extrusions to the cutting platen while an outfeed conveyor conveys extrusions away from the platen. A rail assembly is mounted to the frame above the cutting platen and a carriage is movably mounted to the rail assembly. A rotatably driven skiving blade is mounted to the carriage and cuts the extrusion at the cutting platen as the carriage moves along the rail assembly. The rail assembly is pivotally mounted to the frame so that the dynamically variable angle of the cut made by the skiving blade may be varied.

7 Claims, 11 Drawing Sheets

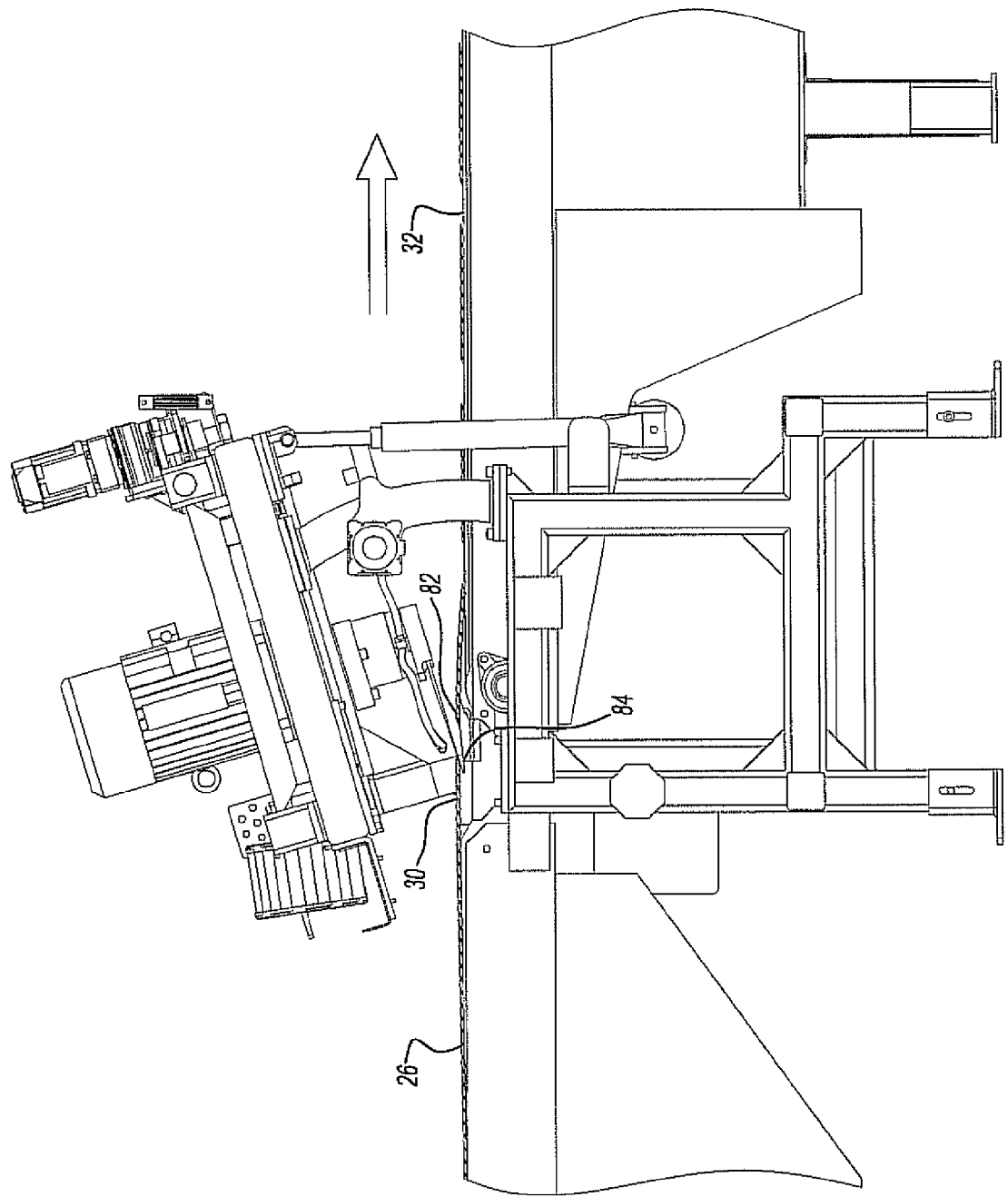

TIRE TREAD SKIVING MACHINE

BACKGROUND OF THE INVENTION

I. Field of the Invention

The present invention relates generally to a tire tread skiving machine or rubber industry.

II. Description of Related Art

In the production of tires for automotive vehicles, a synthetic rubber extrusion is conveyed by a conveyor to a cutting platen. At the cutting platen, a skiving blade performs the cut through the extrusion to form a length of the extrusion corresponding exactly to the required length of tire tread which can be adjusted on the fly for the particular automotive vehicles. Different tire sizes, of course, require different lengths, widths and thickness of tire tread.

Each end of the tire tread extrusion is cut to a precision angle. Consequently, when the tire tread is wrapped around the carcass for the tire the two ends of the extrusion ideally meet in a flush fashion to complete the tread. The overall tire is then vulcanized to complete the manufacture of the tire.

One difficulty of these previously known machines for cutting tire treads from a synthetic rubber extrusion is that the angle of the cut through the extrusion is fixed and cannot be dynamically varied. While that fixed angle is satisfactory for many automotive vehicle tire applications, in some cases, a fixed angle of the cut through the tire tread extrusion is unacceptable. For example, it has been discovered that high-speed tires of the type used by racing cars experience a "speed bump" each time the tire rotates around the junction of the two ends of the tire tread extrusion. This "speed bump" can result not only in excessive tire wear, but also undesirable vibration in the vehicle.

A still further disadvantage of these previously known tire tread skiving machines is that the tire tread extrusion is extremely tacky following the extruding operation. As such, even after the skiving blade formed the cut through the tire tread extrusion, the high tackiness of the ends of the tire tread extrusion around the cut would cause adjacent tire treads to stick together. This, in turn, required that the tire tread extrusion discarded.

SUMMARY OF THE PRESENT INVENTION

The present invention provides a tire tread skiving machine which overcomes all of the above-mentioned disadvantages of the previously known machines.

In brief, the skiving machine of the present invention comprises an elongated frame having two spaced ends. An elongated cutting platen extends transversely across the frame between the two ends of the frame.

An infeed conveyor is mounted to the frame and extends from one end of the frame to the cutting platen. This infeed conveyor is adjustable and independent to the outfeed conveyor adapted to move a tire tread extrusion perpendicular to the cutting platen.

Similarly, an outfeed conveyor is also mounted to the frame and extends from the cutting platen to the other end of the frame. This outfeed conveyor is adjustable and independent to the infeed conveyor adapted to move a tire tread cut from the extrusion away from the cutting platen following the cutting operation.

A rail assembly is mounted to the frame so that the rail assembly overlies the cutting platen. A carriage is movably mounted to the rail assembly and is movable in a direction parallel to the cutting platen and thus transverse to the longitudinal axis of the frame.

A rotatably driven skiving blade is mounted to the carriage so that the skiving blade registers with the cutting plane. Consequently, as the carriage is moved along the cutting platen, the skiving blade contacts and cuts a tire tread extrusion positioned at the cutting platen.

The rail assembly is pivotally mounted to the frame. Consequently, by varying the pivotal position of the rail assembly, the angle of cut of the skiving blade through the tire tread extrusion may be altered as desired and also is dynamically adjustable.

BRIEF DESCRIPTION OF THE DRAWING

A better understanding of the present invention will be had upon reference to the following detailed description when read in conjunction with the accompanying drawing, wherein like reference characters refer to like parts throughout the several views, and in which.

DETAILED DESCRIPTION OF A PREFERRED EMBODIMENT OF THE PRESENT INVENTION

Figure 1:
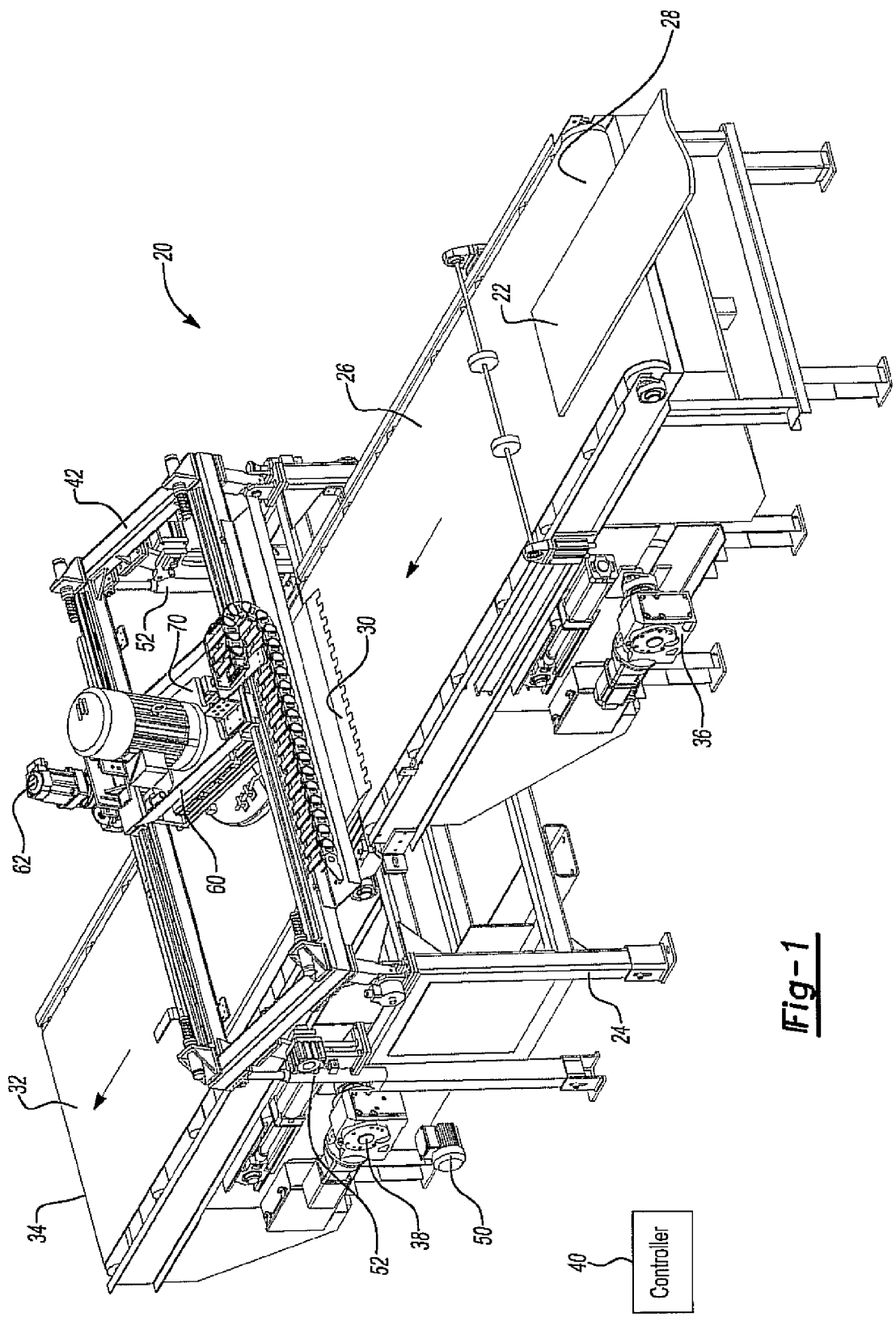
FIG. 1 is an elevational view illustrating a preferred embodiment of the present invention.

With reference first to FIG. 1, a preferred embodiment of a tire tread skiving machine 20 is shown for cutting tire treads from a tire tread extrusion 22. The tire tread extrusion 22 is typically constructed of a synthetic rubber, although other materials may alternatively be used.

The machine 20 includes an elongated frame 24, preferably made of stainless steel, which is supported on a ground support surface. An infeed conveyor 26 extends from one end 28 of the frame 24 to a cutting platen 30. Similarly, an outfeed conveyor 32 is also mounted to the frame 24. The outfeed conveyor 32 extends from the cutting platen 30 to an outfeed end 34 of the frame 24.

Both the infeed conveyor 26 as well as the outfeed conveyor 32 are preferably belt conveyors. A first motor 36 drives the infeed conveyor 26 while a second motor 38 drives the outfeed conveyor 32, and both motors are able to have independent adjustable feed rates.

Both motors 36 and 38 are precision motors, such as DC servo motors, and are operated under the control of a controller 40. The controller 40 may be of any conventional construction, such as microprocessor based, hardwired, or the like. Furthermore, as will become hereinafter apparent, the controller 40 not only controls the activation of the conveyor motors 36 and 38, but also other operations of the machine 20.

Figure 11:
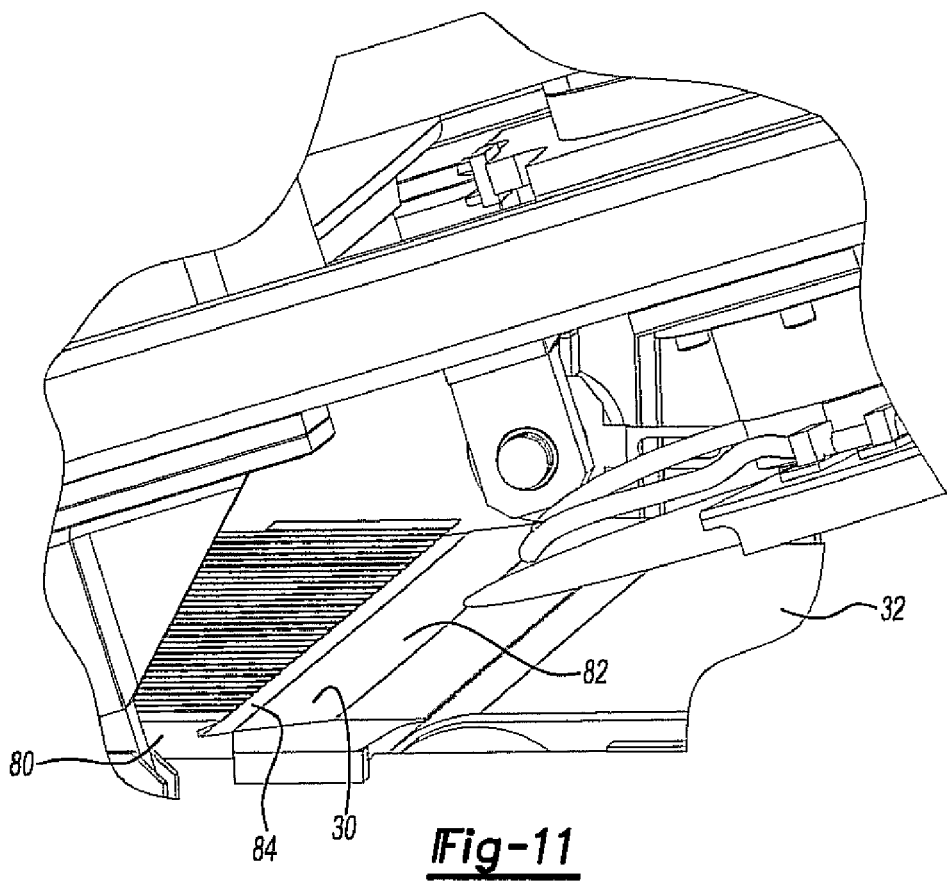
FIG. 11 is an elevational side view with the parts removed.
Figure 12:
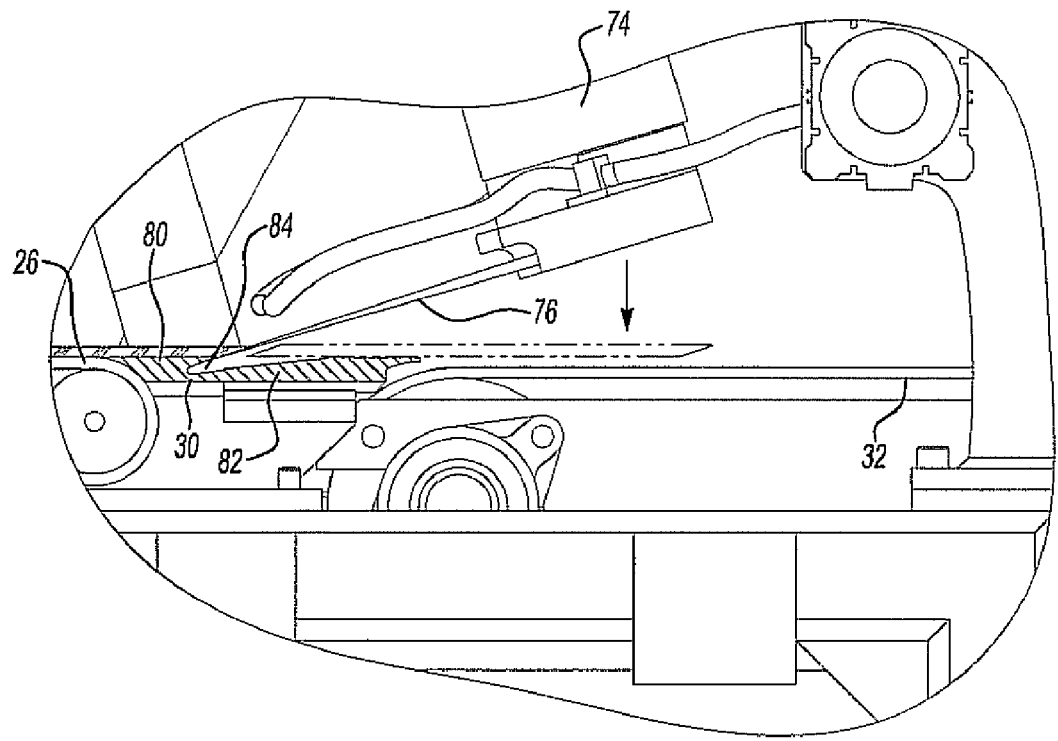
FIG. 12 is a side view with parts removed.
Figure 13:
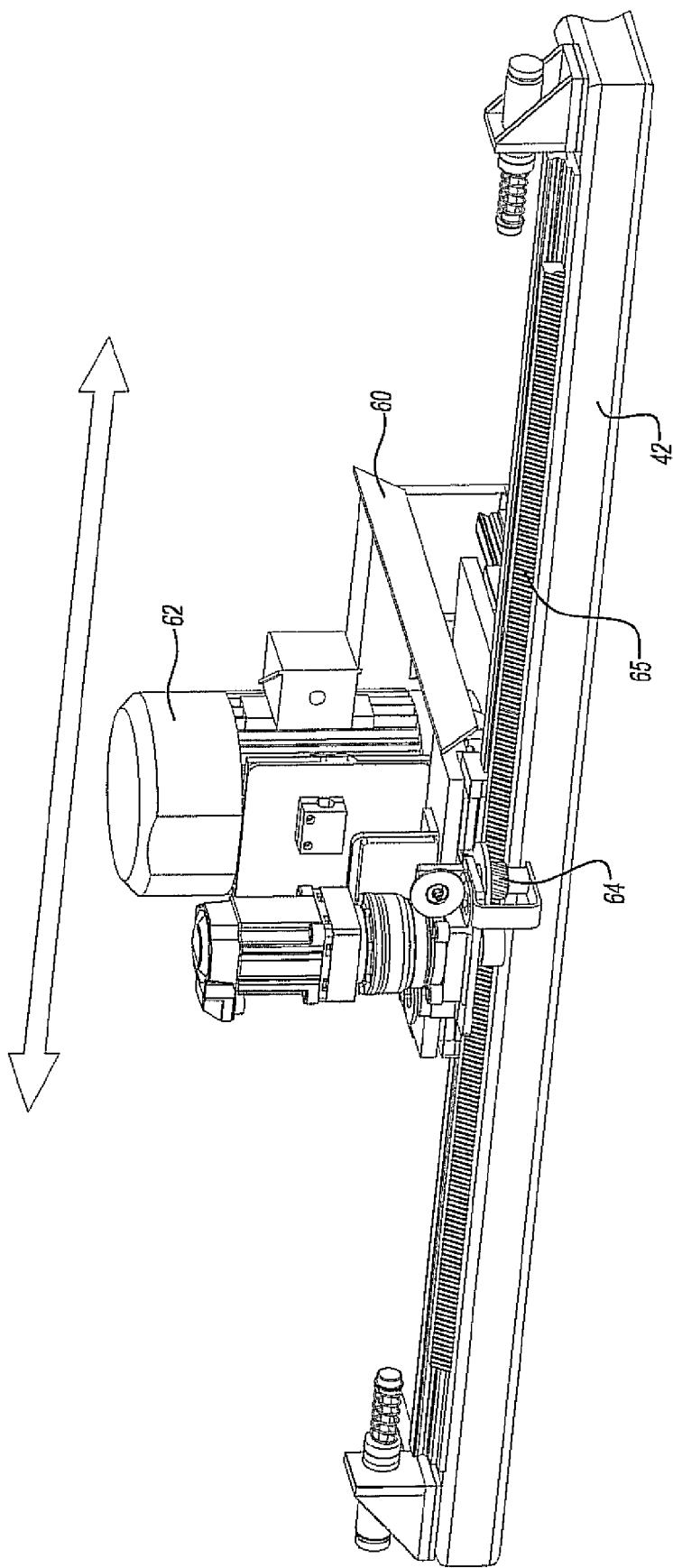
FIG. 13 is a view of the rail assembly and carriage with parts removed.

With reference now particularly to FIGS. 1, 11 and 12, the cutting platen 30 overlies a portion of the inner end of both the infeed conveyor 26 as well as the outfeed conveyor 32. As such, the cutting platen extends transversely across the frame 24 in a direction perpendicular to the direction of movement of the conveyors 26 and 32 and thus of the extrusion 22.

Figure 3:
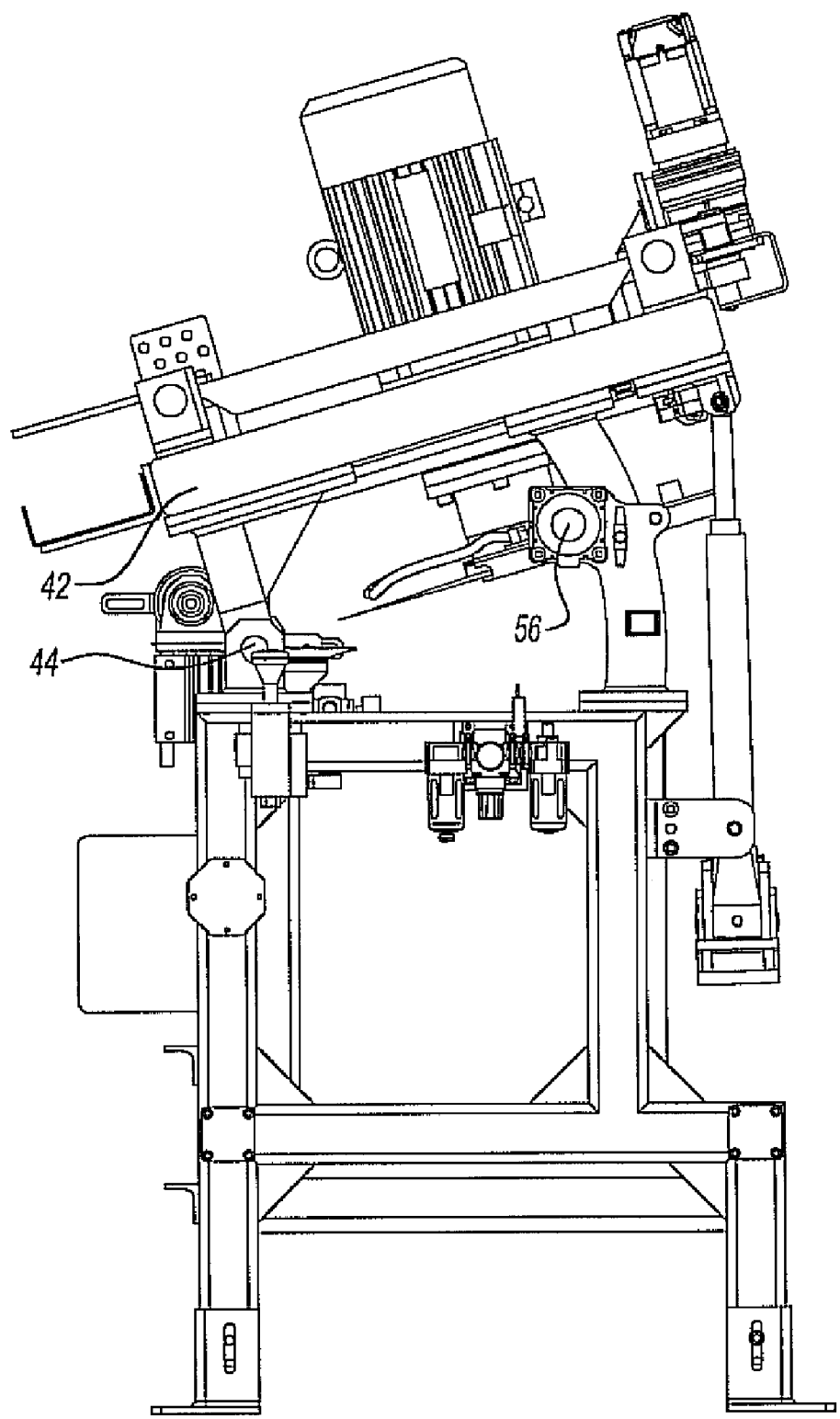
FIGS. 3 and 4 are fragmentary side views illustrating the tilting operation of the present invention.
Figure 4:
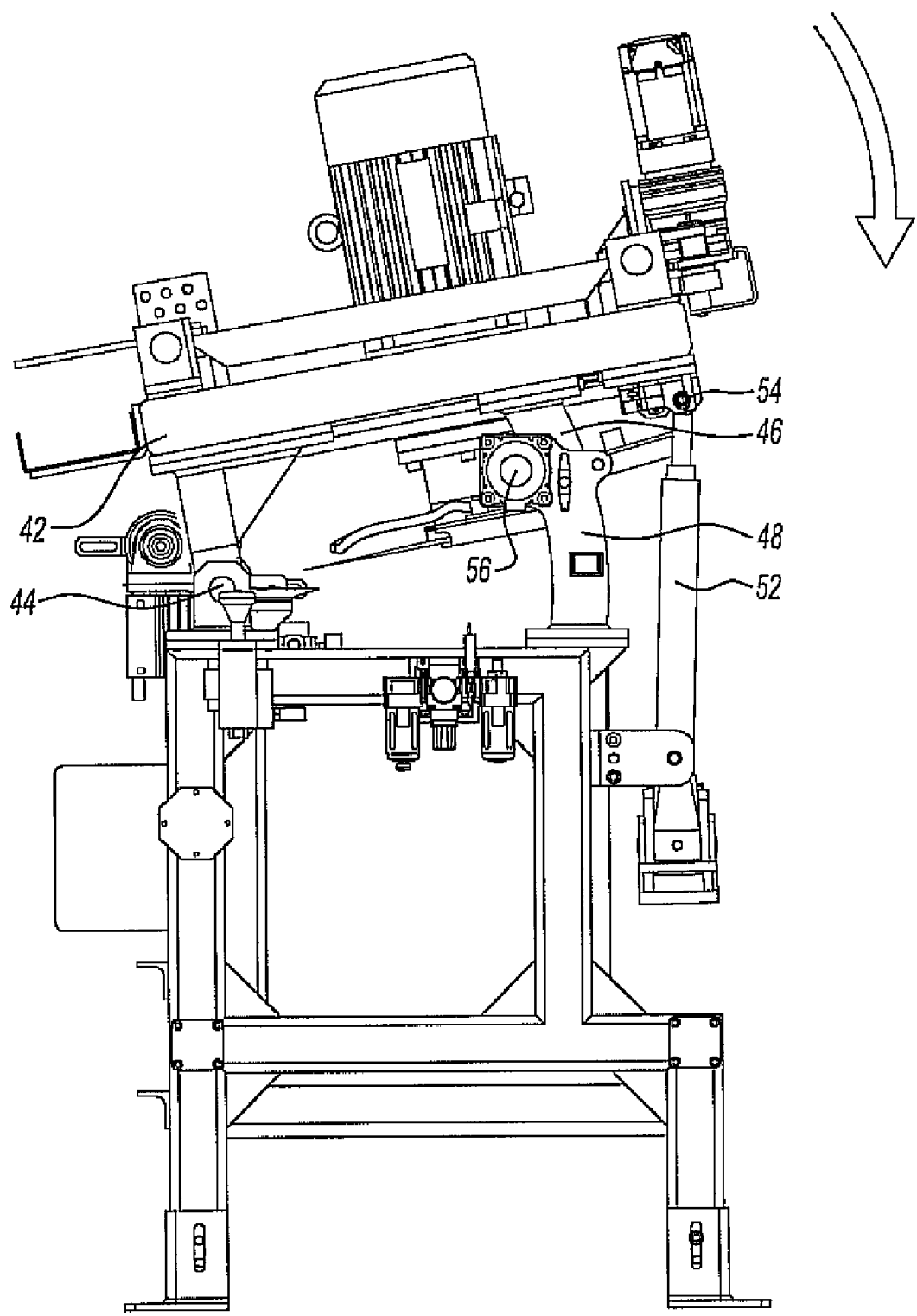

With reference now particularly to FIGS. 1, 3 and 4, a generally rectangular rail assembly 42 is pivotally mounted on one side by pivot pins 44 to the frame 24 so that the rail assembly 42 overlies the cutting platen 30. Two or more arcuate legs 46 extend downwardly from the rail assembly 42 on the side opposite from the pivot pins 44. These arcuate legs 46 are received in like shaped channel members 48 attached to the frame. Preferably, one arcuate leg 46 and its associated receiving channel 48 are provided at each end of the rail assembly 42.

In order to change the pivotal position of the rail assembly 42, a motor 50 (FIG. 1) is mounted to the frame 24 and simultaneously rotatably drives a pair of ball screw actuators 52 through a shaft. One end of each ball screw actuator 52 is secured to the frame 24 while the upper end of each ball screw actuator 52 is pivotally secured to the rail assembly 42 by a pivot connection 54. Consequently, actuation of the motor 50 varies the pivotal position of the rail assembly 42 as shown in FIGS. 3 and 4. Once the rail assembly 42 is pivoted to the desired position, the controller 40 actuates a lock 56 to securely attach the arcuate leg 46 to its associated channel member 48 and thus rigidly secures the rail assembly 42 to the frame 24 in its adjusted pivotal position.

It will be understood, of course, that the two pivotal positions illustrated in FIGS. 3 and 4 of the patent drawing are by way of example only. In practice, the pivotal position of the rail assembly 42 may be finitely adjustable between the extremes of the pivotal movement of the rail assembly 42. Similarly, although ball screws 52 are illustrated as the preferred fashion to pivot the rail assembly 42, it will be understood that any other type of mechanical connector may alternatively be used to pivot the rail assembly 42 to the desired pivotal position.

With reference now to FIGS. 1, 9, 10 and 13, a carriage 60 is slidably mounted to the rail assembly 42 so that the carriage 60 is movable in a direction parallel to the cutting platen 30 and thus in a direction transverse to the direction of movement of the conveyors 26 and 32. Although any means may be used to move the carriage 60 along the rail assembly 42, preferably a motor 62, such as a stepping motor or servo motor, is mounted to the carriage and rotatably drives a pinion 64 in mesh with a rack 65 (FIG. 13) mounted to the rail assembly 42. Consequently, rotation of the motor 62 drives the carriage 60 in the direction indicated by arrow 66 in FIG. 9 while rotation of the motor 62 in the opposite direction drives the carriage 60 in the direction of arrow 68 shown in FIG. 10. The controller 40 controls the activation of the motor 62 and thus the speed, direction and position of the carriage 60.

Figure 14:
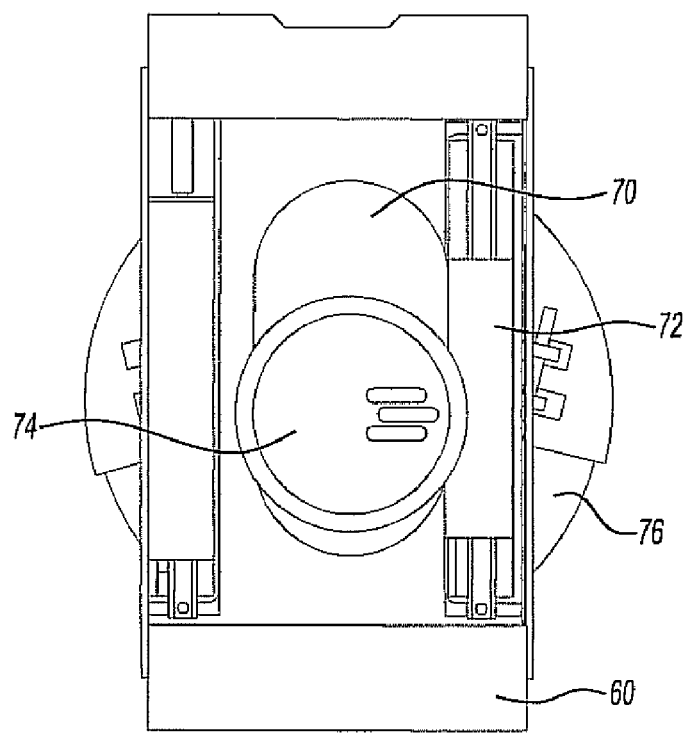
FIGS. 14 and 15 are diagrammatic views of the carriage.
Figure 15:
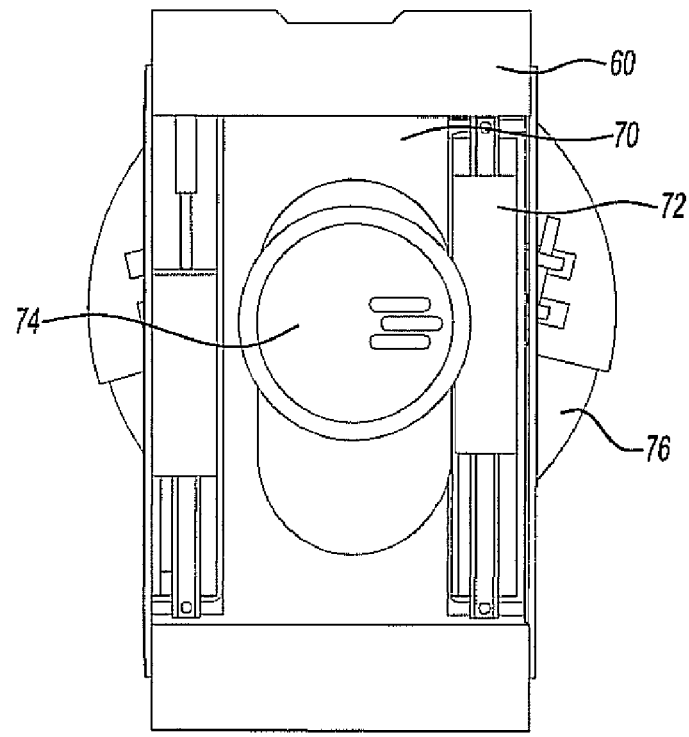

Referring now to FIGS. 14 and 15, a slide 70 is mounted to the carriage 60. This slide 70 is movable in a direction transverse to the direction of movement of the carriage 60 between an operating position, shown in FIG. 14, and a retracted position, shown in FIG. 15. An actuator 72, such as a pneumatic actuator, controls the position of the slide 70. The operation of the actuator 72 is also controlled by the controller 40.

A motor 74 is mounted to the slide 72, which, when activated, rotatably drives a skiving blade 76. As best shown in FIG. 12, with the slide 70 in its operating position and the carriage 60 positioned on one side of the tire tread extrusion 22, the skiving blade 76 registers with the tire tread extrusion 22. Consequently, upon actuation of the carriage motor 62, the carriage 60 is driven laterally across the cutting platen 32 to form the cut through the extrusion 22. After the cutting operation, the actuator 72 moves the slide 70 to its retracted position so that the skiving blade 76 is spaced upwardly and away from the extrusion 22. Thus, upon reverse activation of the carriage motor 62 and movement of the slide 70 to its operating position, the carriage 60 is retracted to its original position in preparation for the next cutting operation.

Figure 16:
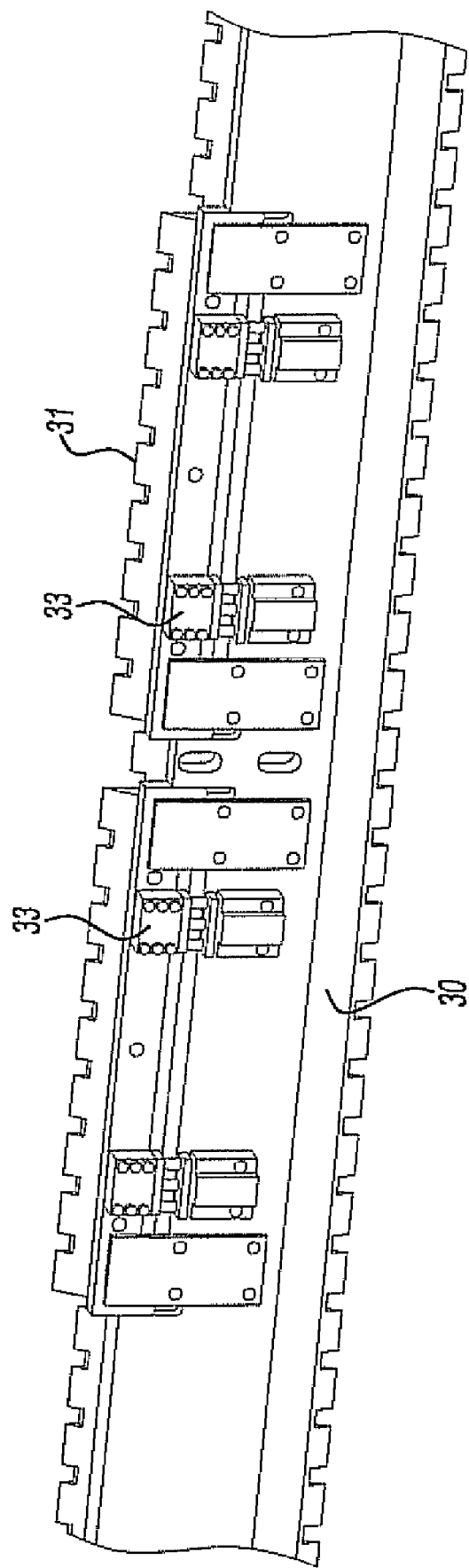
FIG. 16 is a fragmentary view of the platen.

With reference now to FIGS. 11 and 12, the cutting platen 30 is there shown in greater detail. The cutting platen 30 includes a first portion 80 which overlies and is substantially flush with the infeed conveyor 26 as well as a second portion 82 that is flush with and overlies the end of the outfeed conveyor 32. A cutting well 84 is formed in between the portions 80 and 82 of the cutting platen 30 and this well 84 is dimensioned to register with and receive the skiving blade 76 without contacting the blade 76 when the slide 70, and thus the skiving blade 76, are in their operative position. Additionally, the platen 30 preferably includes a telescopic cutting platen section 31 (FIG. 16) that extends during a low degree angle, e.g. 8 degrees, cut with water bubbler assist holes to support the rubber extrusion during the cutting process and aid to the stick-slip condition that occurs on the tread while being advanced to the next cut length. Actuators 33 (FIG. 16), such as air cylinders, control the movement of the platen section 31 and move the platen section 31 to an extended position for low angle cuts. For higher angle cuts, the actuators 33 move the platen section 31 back to the retracted position.

The second portion 82 of the cutting platen 30, however, has the capability to be spaced slightly lower than the first portion 80 of the cutting platen 30 to optimize the cutting condition. Thus, during a cutting operation, the extrusion 22 drops down onto the second and lower portion 82 of the cutting platen. This, in turn, eliminates potential contact between the cut ends of the extrusion 22 and thus prevents the cut ends of the extrusion 22 from re-adhering to each other and the conveyors have the capability to pull the tread at different feed rates to assist in the separation of the tread.

With reference now to FIGS. 5-8, the operation of the skiving machine 20 will be described. It will be understood, of course, that many components of the skiving machine 20 have been removed in FIGS. 5-8 for clarity.

Figure 5:
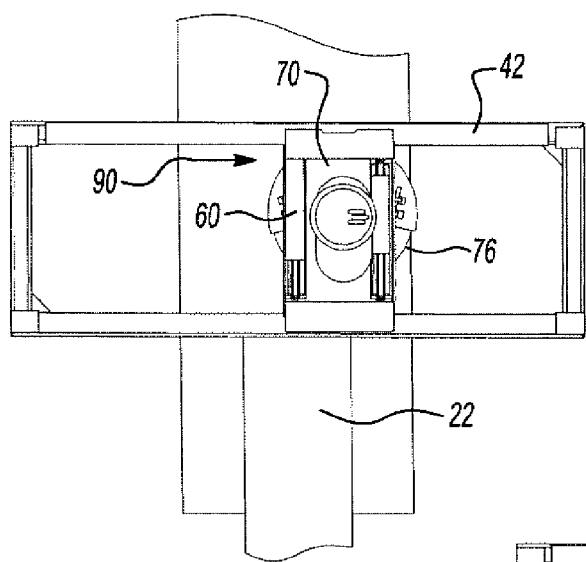
FIGS. 5-8 are top diagrammatic views illustrating the operation of the present invention.

With reference now to FIG. 5, after a cutting operation, the slide 70 together with the skiving blade 76 are moved to the retracted position so that the skiving blade 76 is spaced upwardly from the extrusion 22. In this position, the carriage 60 is moved to its retracted position as shown by arrow 90 under control of the controller 40 until the blade 76 is positioned to one side of the extrusion 22.

Figure 6:
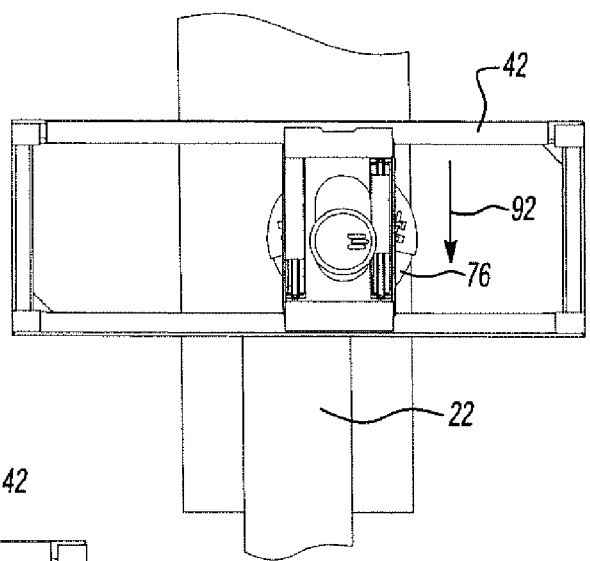
Figure 7:
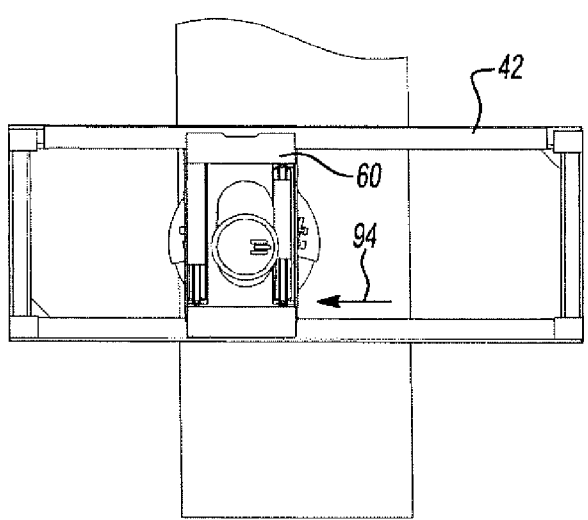
Figure 8:
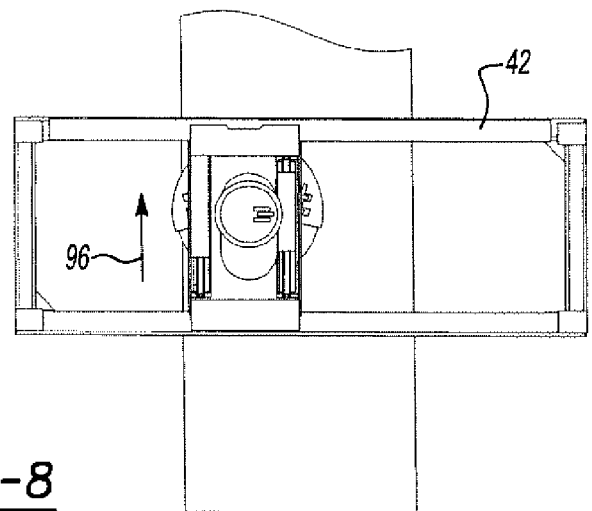
Figure 9:
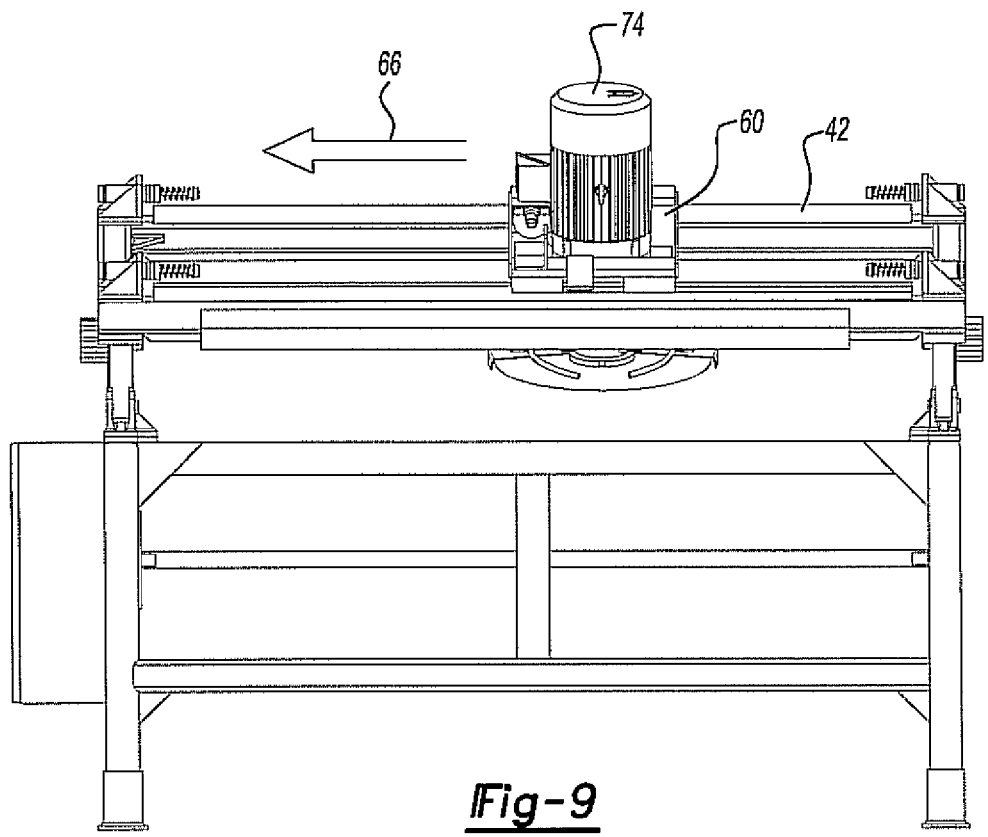
FIGS. 9 and 10 are fragmentary end views illustrating the operation of the present invention.
Figure 10:
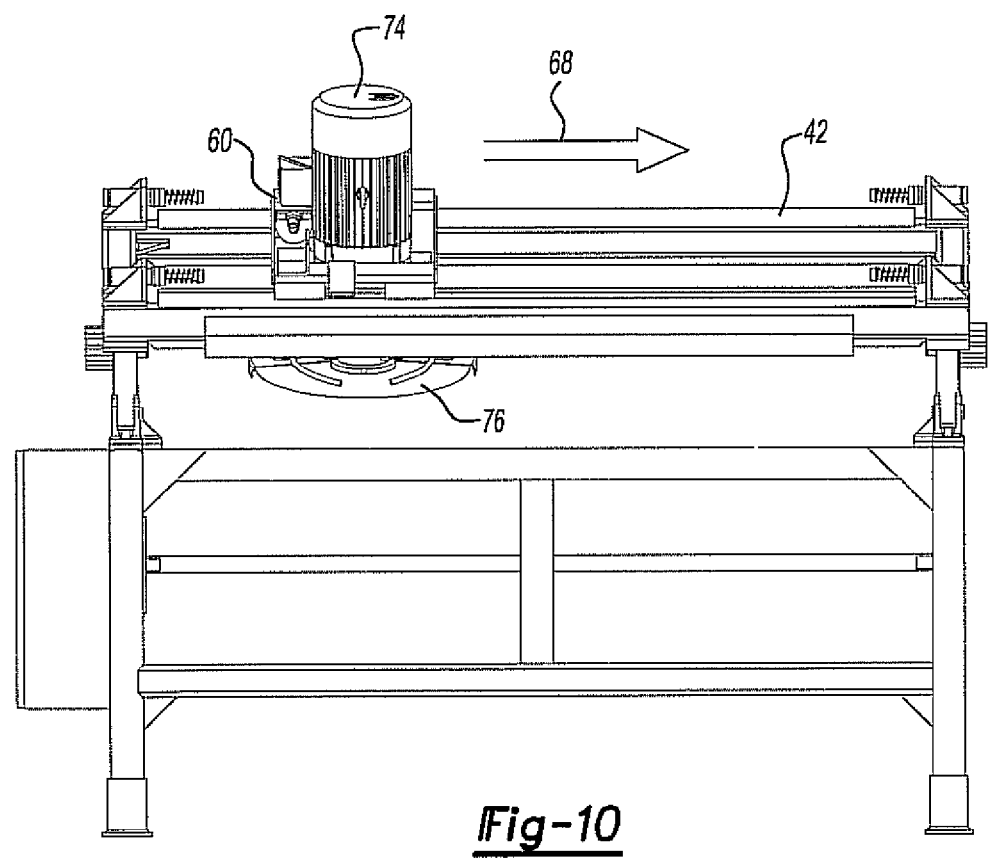

With reference now to FIG. 6, the controller 40 activates the actuator 72 to move the slide 72, and thus the skiving blade 76, into an operative position as shown by arrow 92. In its operative position, the skiving blade 76 registers with the extrusion 22 supported on the cutting platen 30 and so that the skiving blade 76 registers with the well 84 and the cutting platen 30.

With reference now to FIG. 6, in order to perform the skiving or cutting operation, the controller 40 activates the carriage motor 62 to drive the carriage 60 in the direction of arrow 94 and thus across the extrusion 22 to form the desired cut through the extrusion 22. The controller 40 then moves the slide 70 to its retracted position, as shown by arrow 96 in FIG. 8, whereupon the process beginning in FIG. 5 is repeated.

Figure 2A:
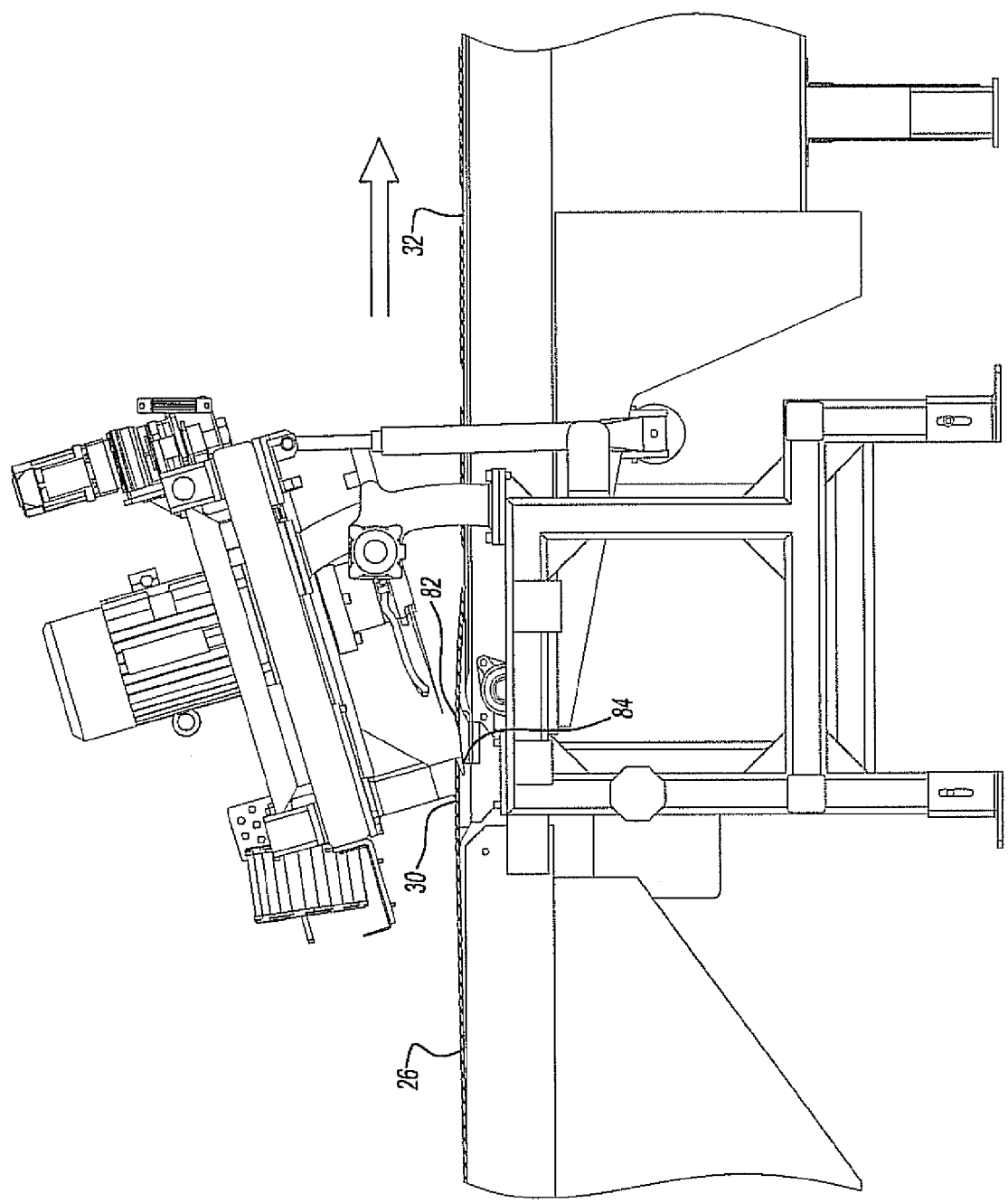
FIG. 2 is a fragmentary side view illustrating a portion of the preferred embodiment of the present invention.

With reference now to FIG. 2, following the cutting operation, the controller 40 first activates the outfeed conveyor 32 for a period of time prior to activation of the infeed conveyor 26. This forms a space in between the cut tire treads on the outfeed conveyor 32 to prevent adhesion of the ends of adjacent tire treads together.

With reference again to FIGS. 5-8, in the preferred embodiment of the invention, the controller 40 is programmed so that the stroke of the carriage 60 along the rail assembly 42 is sufficient to completely cut through the extrusion 22. Since the width of the extrusions 22 may vary from one type of tire and to the next, the stroke or travel of the carriage 60 preferably varies under control of the controller 40 to accommodate different tire tread widths while avoiding unnecessary travel of the carriage 60 along the rail assembly 42.

Similarly, it will be understood that following the cutting operation indicated in FIG. 6, and during the retraction of the carriage assembly 60 illustrated in FIG. 5, the infeed conveyor 26 is activated to move a next length of extrusion into position over the cutting platen 30 in preparation for the next cutting operation. The controller 40 controls the activation of the infeed conveyor 26 in order to position the required length of extrusion on the outfeed conveyor 32 from the cutting platen 30 in accordance with the diameter of the tire for which the tire treads are cut. Additionally, the angle of the cut through the extrusion 22 may be varied at any desired time between cutting operations to change the pivot angle of the rail assembly 42 in the fashion previously described.

From the foregoing it can be seen that the tire tread skiving machine of the present invention provides many advantages over the previously known skiving machines. In particular, the angle of cut at the ends of the tire tread may be varied as desired in order to optimize the performance of the final tire. Furthermore, since the controller 40 precisely controls not only the infeed conveyor 26, but also the outfeed conveyor 32, the precise length of the cut tire treads may be carefully controlled to obtain the desired length and width of the cut required on the tire treads. As such, additional cutting of the tire treads to obtain the correct length and angle for the tire treads is unnecessary done on additional equipment in the plant prior to the final assembly.

Having described my invention, however, many modifications thereto will become apparent to those skilled in the art to which it pertains without deviation from the spirit of the invention as defined by the scope of the appended claims.

I claim:

1. A tire tread skiving machine comprising:
an elongated frame having two spaced ends,
an elongated cutting platen extending transversely across said frame between said two ends,
an infeed conveyor mounted to the frame and extending from one end of the frame to said cutting platen, said infeed conveyor adapted to move an extrusion to said cutting platen,
an outfeed conveyor mounted to the frame and extending from said cutting platen to the other end of the frame, said outfeed conveyor adapted to move a tire tread cut from the extrusion away from said cutting platen,
a rail assembly mounted to said frame so that said rail assembly overlies said cutting platen,
a carriage movably mounted to said rail assembly in a direction parallel to said cutting platen,
a slide linearly movably mounted to said carriage in a direction transverse to the axis of the cutting platen and also transverse relative to the direction of movement of said carriage,
a motor mounted to said slide and movable therewith,
a skiving blade rotatably driven by said motor,
an actuator connected to said slide and operable to move said slide together with said skiving knife between a retracted position in which said skiving knife is spaced outwardly from said cutting platen and an operative position in which an outer periphery of said skiving knife is positioned within a well extending along said cutting platen,
wherein said rail assembly is pivotally mounted to said frame so that, by varying the pivotal position of said rail assembly, the angle of cut of said skiving blade through the extrusion is likewise varied.

2. The invention as defined in claim 1 wherein said actuator is a pneumatic actuator.

3. The invention as defined in claim 1 and comprising a tilt motor mounted to said frame, a mechanical connector operatively coupled between said tilt motor and said rail assembly so that rotation of said tilt motor varies the pivotal position of said rail assembly.

4. The invention as defined in claim 3 wherein said mechanical connector comprises at least one ball screw.

5. The invention as defined in claim 1 wherein said cutting platen includes a first portion which overlies an end of said infeed conveyor and a second portion which overlies an end of said outfeed conveyor, said second portion being positioned below said first portion.

6. The invention as defined in claim 1 and comprising a controller which controls the activation of said infeed and outfeed conveyors, said controller activating said outfeed conveyor for a period of time following a skiving operation prior to activation of said infeed conveyor.

7. The invention as defined in claim 1 and comprising a controller which varies the travel of the carriage on the rail assembly as a function of the width of the extrusion.

* * * * *